United States Patent [19]
Rutz et al.

[11] 3,759,945
[45]*Sept. 18, 1973

[54] ALIPHATIC OXAALKYL-2,4,5-TRIHALOGENO-IMIDAZOLES

[75] Inventors: Hans Rutz, Basel; Kurt Gubler, Riehen, both of Switzerland

[73] Assignee: Ciba-Geigy Corporation, Ardsley, N.Y.

[ * ] Notice: The portion of the term of this patent subsequent to Dec. 7, 1988, has been disclaimed.

[22] Filed: June 28, 1971

[21] Appl. No.: 157,698

Related U.S. Application Data

[63] Continuation of Ser. No. 723,903, April 24, 1968, Pat. No. 3,625,953.

[30] Foreign Application Priority Data

Apr. 26, 1967   Switzerland.................... 5960/67

[52] U.S. Cl.................................. 260/309, 71/92
[51] Int. Cl............................................ C07d 49/36
[58] Field of Search................................. 260/309

[56] References Cited
UNITED STATES PATENTS 3,501,286   3/1970   Draber et al........................... 71/92
3,625,953   12/1971  Rutz et al. .......................... 260/309
3,423,420   1/1969   Buchel et al........................ 260/309

OTHER PUBLICATIONS

Netherlands Application I 6,407,401 1–1965 (9 pages spec.).

Netherlands Application II 6,510,168 2–1966 (14 pages spec.).

Netherlands Application III 6,609,596 1–1967 (pages 1–6, 14–23, 1 page drawing relied on.

Primary Examiner—Natalie Trousof
Attorney—Karl F. Jorda et al.

[57]   ABSTRACT 2,4,5-trihalogeno-imidazoles substituted in 1-position at the imidazole nucleus by a group of the formula R—O—A— wherein R represents an optionally substituted aliphatic hydrocarbon radical and A represents an alkylene group, are described, which imidazoles are herbicidally active and useful in the control of weeds and the like undesirable plant growth; herbicidal compositions containing such imidazoles as active ingredients, and method of controlling undesirable plant growth with the aid of such compounds are also disclosed.

3 Claims, No Drawings

ALIPHATIC OXAALKYL-2,4,5-TRIHALOGENO-IMIDAZOLES

CROSS REFERENCE TO RELATED APPLICATION

This application is a continuation of our co-pending application Ser. No. 723,903, filed Apr. 24, 1968, now U.S. Pat. No. 3,625,953.

DETAILED DISCLOSURE

The present invention concerns new aliphatically-substituted oxaalkyl-2,4,5-trihalogeno-imidazoles, processes for the production thereof, also herbicidal compositions which contain these new imidazoles as active substances, and in addition, processes for the production of these compositions and processes for controlling weeds and other unwanted plant growth with the aid of the new active substances.

N-Substituted trihalogen imidazoles having herbicidal, insecticidal and acaricidal activity are known from the literature.

The new imidazole derivatives according to the invention having surprisingly superior herbicidal properties are embraced by the general formula I

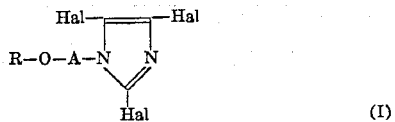

(I)

wherein
R — represents an unsubstituted or substituted aliphatic hydrocarbon radical,
A — represents an alkylene radical, and
Hal — represents a halogen atom having an atomic number of at most 35.

The new imidazole derivatives of the general formula I are obtained according to the invention by reacting according to procedure a. a trihalogen imidazole of the general formula II

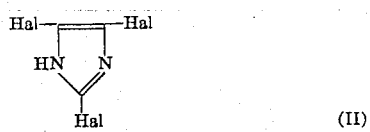

(II)

with an ether of the general formula III $$R - O - A - Hal$$

(III)

in which formulae Hal, R and A have the meanings given in formula I, in the presence of an acid binding agent; or by reacting according to procedure b. a trihalogen imidazole of the general formula IV

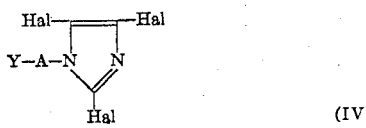

(IV)

with a compound of the general formula V $$R - Z$$

(V)

in which formulae

Y and Z with the exception of an O atom contained in either Y or Z, represent radicals which are split off in the reaction, and
Hal, R and A have the meanings given in formula I, optionally in the presence of an acid binding agent.

In the imidazole derivatives of general formula I, R as aliphatic hydrocarbon radical can represent e.g. an alkyl radical having one to 16 carbon atoms, preferably however, a lower alkyl radical such as the methyl, ehtyl, propyl, butyl or pentyl radicals, etc., also it can represent a lower alkenyl radical such as the allyl, crotyl or methallyl radical, or a lower alkinyl radical such as the propinyl or 1-methyl-2-propinyl radical. These hydrocarbon radicals can be mono- or poly-substituted, e.g. by halogen, lower alkoxy, lower alkylthio or cyano groups. The chain of the alkylene radical A can be straight or branched and has, preferably, 1 or 2 carbon atoms as chain members. Preferred halogen atoms Hal are chlorine and, particularly, bromine.

"Lower" used in connection with an aliphatic radical means that the latter has at most four carbon atoms.

As acid binding agents in the process according to procedures a and b of the invention, preferably inorganic bases such as hydroxides and oxides of alkali and alkaline earth metals, e.g. potassium or sodium hydroxide, as well as alcoholates of low alkanols with alkali metals such as sodium and potassium methylate, ethylate, propylate, isopropylate, butylate, particularly potassium tert. butylate, or mixtures of hydroxides and alcoholates are used. It is of advantage to perform the process according to procedures a and b in the presence of solvents or diluents which are inert to the reaction partners, i.e: hydrocarbons, halogenated hydrocarbons, amides such as dialkyl carboxylic acid amides, ethers and ethertype compounds, and also alcohols in the case of procedure b.

In the process according to procedure a of the invention, advantageously the trihalogen imidazole of the general formula II is converted with one of the strong inorganic bases mentioned above into the corresponding imidazole salt. Because of its sensitivity to air, this is preferably reacted in an inert gas atmosphere, e.g. under nitrogen, with an ether of general formula III.

Of the symbols Y and Z in general formulae IV and V, one represents the hydroxyl group and the other a halogen atom, or one represents the group O—Me wherein Me is a metal atom and the other represents a halogen atom.

Of the starting materials embraced by the general formulae II and IV some are known and some are new. 2,4,5-Trichloroimidazole falling under the general formula II can be prepared by reacting 2,4,5-tribromoimidazole with HCl. The compound falling under the general formula IV, in which e.g. Hal in 2-position is chlorine and in 4- and 5-position is bromine, and in which Y-A- represents chloromethyl, can be prepared by reacting the hydroxymethyl-tribromo derivative with thionyl chloride in dimethyl formamide.

Some of the new imidazole derivatives are crystalline, others are oils. The new compounds are stable and dissolve well in the usual organic solvents. They are only slightly toxic to wam blooded animals.

The new imidazole derivatives of the general formula I have very good herbicidal properties. They are excellently suited for influencing the growth of plants, and especially for the control of weeds and the like undesirable plant growth in various cultivated areas.

The imidazole derivatives of the general formula I are used in compositions in amounts of 0.5 to 10 kg of active substances per hectare. Preferred dosages are between 1.25 and 5 kg of active substance per hectare. These compositions comprise additives usual in weed killers such as agriculturally acceptable non-aqueous or partially aqueous carriers and distributing agents.

Thus, the compositions according to the invention can be in the form of and applied as solutions, dusts, sprinkling agents, particularly however, in the form of solutions which can be emulsified in water or powders which can be dispersed in water. A fine distribution of the active substances must be attained on application.

The content of active substance in the compositions according to the invention varies within the range of 1 and 90 parts per 100 parts by weight of the composition.

Dusts and sprinkling compositions, which latter also embrace granulates, can be produced by mixing or milling the active substance with the usual solid carriers. Examples of such are: talcum, diatomaceous earth, kaolin, bentonite, calcium carbonate, tricalcium phosphate, sand, and also sawdust, ground cork and other materials of vegetable origin. The substance can also be brought onto carriers by means of a volatile solvent.

Wettable powders are obtained by mixing and milling together the active substance with solid carriers such as chalk, kaolin, highly dispersed silicic acid and silicates, and also with the necessary amounts of wetting and dispersing agents to a particle size of 0.05 to 40 microns.

Also emulsifiable solutions serve for the production of aqueous application forms, e.g. solutions of the active substance in higher boiling organic solvents such as xylene, to which, if desired, suitable solubility promoters and/or suitable emulsifying agents are admixed.

In a similar way, liquid or paste-like concentrates can be produced by mixing the active substance with dispersing agents, organic solvents and, optionally, pulverised solid carriers, in suitable apparatus until homogeneity is attained. These concentrates are then diluted with water before use.

Suitable emulsifying and dispersing agents are, e.g. anion active alkali metal salts of sulphuric acid monoesters of long chain aliphatic alcohols, of aliphatic-aromatic sulphonic acids or of lang chain alkoxyacetic acids, and non-ionogenic emulsifying and dispersing agents from the classes of polyethylene glycol ethers of fatty alcohols or alkyl phenols, higher polycondensation products of ethylene oxide, and aliphatic-aromatic polyglycol ethers, as well as mixtures thereof with anion active emulsifying agents.

All compositions according to the invention can also contain additives to increase the stability to rain and light as required. In addition they can also contain additives which facilitate the adhesion and, thus, the penetration into the substrate, e.g. animal, vegatable and mineral oils. They can further contain other biocidally active substances, also fertilisers, trace elements etc.

The following examples describe the production of the new active substances; following thereafter, the production of some typical forms for application of the compositions according to the invention is described. Where not otherwise expressly stated, parts are given as parts by weight and the temperatures are given in degrees Centigrade. Wherever mentioned, parts by weight are related to parts by volume as grams to milliliters.

EXAMPLE 1

2 Parts of sodium hydroxide in 50 parts by volume of methanol are added to a solution of 15.2 parts of 2,4,5-tribromo-imidazole in 100 parts by volume of methanol and the resultant solution is evaporated at 40° under water pump vacuum. The colourless, solid residue (sodium salt of tribromo-imidazole) is slurried and concentrated in vacuo twice with 100 parts by volume of anhydrous benzene each time in order to remove water adhering azeotropically thereto. The dry sodium salt of tribromo-imidazole is suspended in 200 parts by volume of anhydrous benzene. A solution of 4 parts of methoxymethyl chloride in 100 parts by volume of benzene is added dropwise to the suspension at room temperature while stirring and introducing nitrogen, whereupon a slightly exothermic reaction takes place and the sodium salt of the tribromo-imidazole dissolves and sodium chloride precipitates. The mixture is then stirred, first for 1 hour at room temperature, then for 1.5 hours at 60°. After cooling, the reaction mixture is extracted with water and then with 2N sodium carbonate solution to remove side products. On acidifying the alkaline aqueous phase with concentrated hydrochloric acid, unreacted tribromo-imidazole precipitates as a colourless precipitate. After drying over sodium sulphate, the benzene phase is concentrated in vacuo. The oily residue, 1-methoxymethyl-2,4,5-tribromo-imidazole, crystallises and after recrystallisation from ether/petroleum ether, melts at 92° – 94°.

EXAMPLE 2 a. 1058 Parts of hydrogen chloride are introduced into a stirred solution of 890 parts of 2,4,5-tribromo-imidazole in 2800 parts by volume of dimethyl formamide, the temperature being allowed to rise to 110° during the introduction. The reaction mixture is kept at 130° for 6 hours. On cooling to room temperature the solution solidifies, and the resulting slurry of crystals is charged with 15 000 parts of water. The solid product is filtered, washed with water and dried. Recrystallisation from 50 percent aqueous alcohol yields 2,4,5-trichloro-imidazole melting at 177°–180° with decomposition.

b. A solution of 4 parts of sodium hydroxide in 100 parts by volume of methanol is added to a solution of 17.1 parts of 2,4,5-trichloro-imidazole in 100 parts by volume of methanol and the resulting solution is evaporated at 40° under water pump vacuum. The solid residue is slurried twice with 100 parts by volume of anhydrous benzene and the solvent evaporated in vacuo in order to remove any water adhering thereto. The dry sodium salt of trichloro-imidazole is suspended in 300 parts by volume of anhydrous benzene. A solution of 8 parts of methoxymethyl chloride in 100 parts by volume of benzene is added dropwise to the suspension at room temperature while stirring and introducing nitrogen, whereupon a slightly exothermic reaction takes place and the sodium salt of the trichloro-imidazole dissolves and sodium chloride precipitates. The mixture is then stirred, first for 1 hour at room temperature, then for 1.5 hours at 60°. After cooling, the reaction mixture is extracted with water and then with 2N sodium carbonate solution to remove side products. After drying over sodium sulphate, the benzene phase is concentrated in vacuo. The oily residue is subjected to high vacuum distillation; the pure 1-methoxymethyl-2,4,5-trichloro-imidazole thus obtained boils at 80°–81°/0.007 mm Hg.

EXAMPLE 3 a. 180 Parts of thionyl chloride are added dropwise to a stirred solution of 426 parts of 1-hydroxymethyl-2,4,5-tribromo-imidazole in 1200 parts by volume of dimethyl formamide at a temperature of 0°. The reaction mixture is stirred for 3 hours at room temperature and then for 1 hour at 100°, and after recooling to room temperature, poured into 5000 parts of water. The precipitated solid product is fitered, washed with water and dried. After recrystallisation from benzene, 1-chloromethyl-4,5-dibromo-2-chloro-imidazole is obtained, m.p. 86–87°.

b. A solution of 15.5 parts of 1-chloromethyl-4,5-dibromo-2-chloro-imidazole and 6.8 parts of sodium ethylate in 100 parts by volume of anhydrous alcohol is heated to reflux temperature for 12 hours. The solvent is then removed and the residue dissolved in chloroform/water. The chloroform phase is washed with water, dried over sodium sulphate and evaporated. 1-Ethoxymethyl-4,5-dibromo-2-chloro-imidazole is obtained in pure form from the oily residue by distillation; b.p. 107°–108°/0.005 mm Hg.

The new 2,4,5-trihalo-imidazole derivatives of the general formula I listed in the following Table are obtained in the manner described in Examples 1 to 3.

TABLE I

| No. | Compounds | Physical Constants |
|---|---|---|
| 1 | 181-ethoxymethyl-2,4,5-tribromo-imidazole | b.p. 120°–121°/0.02 mm Hg |
| 2 | 181-n-propyloxy-methyl-2,4,5-tribromo-imidazole | b.p. 114°–116°/0.02 mm Hg |
| 3 | 181-isopropyloxymethyl-2,4,5-tribromo-imidazole | b.p. 109°–110°/0.02 mm Hg |
| 4 | 181-n-butoxymethyl-2,4,5-tribromo-imidazole | $n_D^{23}$ 1.5563 |
| 5 | 181-isobutyloxymethyl-2,4,5-tribromo-imidazole | b.p. 115°–117°/0.03 mm Hg |
| 6 | 181-sec.butoxymethyl-2,4,5-tribromo-imidazole | b.p. 115°–117°/0.1 mm Hg |
| 7 | 181-n-pentoxymethyl-2,4,5-tribromo-imidazole | $n_D^{23}$ 1.5425 |
| 8 | 181-n-octyloxymethyl-2,4,5-tribromo-imidazole | $n_D^{23}$ 1.5234 |
| 9 | 181-dodecyloxymethyl-2,4,5-tribromo-imidazole | $n_D^{23}$ 1.5025 |
| 10 | 181-allyloxymethyl-2,4,5-tribromo-imidazole | $n_D^{23}$ 1.5834 |
| 11 | 181-crotyloxymethyl-2,4,5-tribromo-imidazole | |
| 12 | 181-methallyloxymethyl-2,4,5-tribromo-imidazole | |
| 13 | 181-n-hexyloxymethyl-2,4,5-tribromo-imidazole | |
| 14 | 181-n-hexadecyloxymethyl-2,4,5-tribromo-imidazole | |
| 15 | 181-(2-propinyl)-oxymethyl-2,4,5-tribromo-imidazole | |
| 16 | 181-(1-methyl-2-propinyl)-oxymethyl-2,4,5-tribromo-imidazole | |
| 17 | 181-(2-chloroethyl)-oxymethyl-2,4,5-tribromo-imidazole | |
| 18 | 181-(2-bromoethyl)-oxymethyl-2,4,5-tribromo-imidazole | |
| 19 | 181-(2,2,2-trichloroethyl)-oxymethyl-2,4,5-tribromo-imidazole | |
| 20 | 181-(2-chloro-2-methylpropyl)-oxymethyl-2,4,5-tribromo-imidazole | |
| 21 | 181-(2-bromo-2-methylpropyl)-oxymethyl-2,4,5-tribromo-imidazole | |
| 22 | 181-(2-methyloxyethyl)-oxymethyl-2,4,5-tribromo-imidazole | |
| 23 | 181-(2-ethyloxyethyl)-oxymethyl-2,4,5-tribromo-imidazole | |
| 24 | 181-(2-methylthioethyl)-oxymethyl-2,4,5-tribromo-imidazole | |
| 25 | 181-(2-cyanoethyl)-oxymethyl-2,4,5-tribromo-imidazole | |
| 26 | 181-methyloxymethyl-4,5-dibromo-2-chloro-imidazole | m.p. 80°–81° |
| 27 | 181-n-propyloxymethyl-4,5-dibromo-2-chloro-imidazole | b.p. 103°–106°/0.01 mm Hg |
| 28 | 181-ethyloxymethyl-2,4,5-trichloro-imidazole | b.p. 81°–83°/0.01 mm Hg |
| 29 | 181-n-propyloxymethyl-2,4,5-trichloro-imidazole | b.p. 88°–89°/0.0005 mm Hg |
| 30 | 181-isopropyloxymethyl-2,4,5-trichloro-imidazole | b.p. 82°–84°/0.01 mm Hg |
| 31 | 181-n-butyloxymethyl-2,4,5-trichloro-imidazole | b.p. 90°–93°/0.0005 mm Hg |
| 32 | 181-sec.-butyloxymethyl-2,4,5-trichloro-imidazole | b.p. 81°–83°/0.0005 mm Hg |
| 33 | 181-tert.butyloxymethyl-2,4,5-trichloro-imidazole | |
| 34 | 181-allyloxymethyl-2,4,5-trichloro-imidazole | b.p. 81°–84°/0.001 mm Hg |
| 35 | 181-(1-methyloxyethyl)-2,4,5-trichloro-imidazole | |

WETTABLE POWDER

The following components are used to produce a. a 10%, b. a 20 percent and c. a 40 percent wettable powder:

a. 10 parts of 1-ethyloxymethyl-2,4,5-tribromo-imidazole,
25 parts of sodium aluminium silicate,
30 parts of Champagne chalk,
10 parts of sodium salt of lignin sulphonic acid,
2 parts of nonylphenyl polyethyleneglycol ether (5-15 ethylene oxide radicals),
2 parts of a 1:1 mixture of polyvinyl alcohol:Champagne chalk, and
21 parts of kaolin;

b. 20 parts of 1-isopropyloxymethyl-2,4,5-tribromo-imidazole,
10 parts of kieselguhr,
30 parts of Champagne chalk,
4 parts of oleyl methyl tauride sodium salt,
6 parts of naphthalene sulphonic acid/phenol sulphonic acid/formaldehyde condensate [3:2:0.5], and 30 parts of kaolin;
c. 40 parts of 1-methyloxymethyl-4,5-dibromo-2-chloro-imidazole,
10 parts of sodium salt of lignin sulphonic acid,
20 parts of sodium aluminium silicate,
2 parts of sodium salt of dibutyl naphthalene sulphonic acid,
2 parts of a 1:1 mixture of polyvinyl alcohol:kaolin,
11 parts of Champagne chalk, and
15 parts of kieselguhr.

The amounts of active substances mentioned are intimately mixed with the additives in suitable mixers and milled in corresponding mills and rollers. Wettable powders are obtained which can diluted with water to form suspensions of any concentration desired. Such suspensions are suitable for the treatment of cultivated plants.

Granulate

The following components are used to produce a. a 2 percent and b. a 5 percent granulate:
a. 5 parts of the 40% wettable powder as described above under c),
1 part of kieselguhr,
90 parts of ground limestone (0.4 - 0.8 mm), and
4 parts of polyethylene glycol;
b. 5 parts of 1-allyloxymethyl-2,4,5-trichloro-imidazole,
1,5 parts of kieselguhr,
0,5 parts of cetyl polyglycol ether (8 ethylene oxide radicals),
87 parts of ground limestone (0.4 - 0.8 mm),
5 parts of polyethylene glycol, and
1 part of silicic acid.

The ground limestone is impregnated with the polyethylene glycol and/or the glycol ether respectively and subsequently mixed with the 40% wettable powder or the mixture of active substance and kieselguhr, respectively. Kieselguhr or silicic acid respectively is then added as an anticacking agent. The granulates are especially suited for the treatment of topsoil.

Emulsion Concentrate

The following components are mixed together to produce a 10% emulsion concentrate:
10 parts of 1-allyloxymethyl-2,4,5-tribromo-imidazole,
5 parts of chlorobenzene,
10 parts of cyclohexanone,
70 parts of petroleum distillate (boiling point range 158°–159°, 96% content of aromatic hydrocarbons), and
5 parts of emulsifier consisting of a mixture of the calcium salt of dodecylbenzene sulphonic acid and nonylphenol polyglycol ether condensate, (e.g. "Emullat P 140 HFP," Union Chimique S.A., Brussels).

The active substance is dissolved in the petroleum distillate, and the emulsifier added to this solution. An emulsion concentrate is obtained which can be diluted with water to form emulsions of any concentration desired. Such emulsions are suitable for the treatment of cultivated plants.

The herbicidal activity of trihalogen imidazole derivatives were tested as follows:

I. Pre-emergence Test

Test plants: ray grass, mustard, millet. Immediately after sowing, the surface of the soil was treated with the following active substances in an amount of 5 kg of active substance per hectare.

The results observed after 20 days are given in the following table according to the following scale of ten:

10 = normal growth

0 = all plants were dead

9–1 = graduated increase in damage

| active substance (5 kg/ha) | ray grass | mustard | millet |
|---|---|---|---|
| 1-ethyloxymethyl-2,4,5-tribromo-imidazole | 0.5 | 0.5 | 0 |
| 1-n-propyloxymethyl-2,4,5-tribromo-imidazole | 2 | 0 | 0 |
| 1-isopropyloxymethyl-2,4,5-tribromo-imidazole | 0 | 0 | 0 |
| 1-n-propyloxymethyl-4,5-dibromo-2-chloro-imidazole | 4 | 0 | 1.5 |
| 1-methyl-2,4,5-tribromo-imidazole (known) | 10 | 1.5 | 10 |

II. Post-emergence Field Tests
a. Selective Tests in winter and summer grains
1. Active substance used (A.S.): 1-ethyloxymethyl-2,4,5-tribromo-imidazole
2. Weeds normally present: Chenopodium album, Polygonum conv., Polygonum pers. and Capsella bursa past..
3. Evaluation:

0 = no damage (state of untreated plants)

0.5 = very slight damage

4 = plants were dead

1–3 = graduated increase in damage

Herbicidal activity expressed in %.

| | Time of evaluation expressed in days after treatment | Kg. A.S./ha. | | | | | |
|---|---|---|---|---|---|---|---|---|
| | | 4 | 3 | 2.5 | 2 | 1.75 | 1.5 | 1.25 |
| Winter grains:[1] | | | | | | | | |
| Wheat, 20 cm. high | 36 | 0 | 0.5 | 0.5 | 0 | 0 | 0 |
| | 70 | 0 | 0 | 0 | 0 | 0 | 0 |
| | 100 | 0 | 0 | 0 | 0 | 0 | 0 |
| Rye, 15 cm. high | 36 | 0 | 0 | 0 | 0 | 0 | 0 |
| | 70 | 0 | 0 | 0 | 0 | 0 | 0 |
| | 100 | 0 | 0 | 0 | 0 | 0 | 0 |
| Barley, 20 cm. high | 36 | 0 | 0 | 0 | 0 | 0 | 0 |
| | 70 | 0.5 | 0.5 | 0.5 | 0.5 | 0 | 0 |
| | 100 | 0.5 | 0.5 | 0.5 | 0 | 0 | 0 |
| Herbicidal effect | 69 | 100 | 100 | 100 | 100 | 100 | 100 |
| | 100 | 100 | 100 | 100 | 100 | 100 | 100 |
| Wheat, 50 cm. high | 9 | 0 | 0 | 0 | 0 | 0 | 0 |
| | 73 | 0 | 0 | 0 | 0 | 0 | 0 |
| Rye, 40 cm. high | 9 | 0 | 0 | 0 | 0 | 0 | 0 |
| | 73 | 0 | 0 | 0 | 0 | 0 | 0 |
| Barley, 40 cm. high | 9 | 0 | 0 | 0 | 0 | 0 | 0 |
| | 73 | 0 | 0 | 0 | 0 | 0 | 0 |
| Herbicidal effect | 42 | 95 | 95 | 95 | 95 | 95 | 90 |
| | 73 | 98 | 98 | 98 | 98 | 98 | 90 |

| | Time of evaluation expressed in days after treatment | Kg. A.S./ha. | | | | | | |
|---|---|---|---|---|---|---|---|---|
| | | 4 | 3 | 2.5 | 2 | 1.75 | 1.5 | 1.25 |
| Summer-grains:[1] | | | | | | | | |
| Wheat, 30 cm. high | 18 | 0.5 | 0 | 0 | 0 | ------ | 0 | 0 |
| | 53 | 0.5 | 0 | 0 | 0 | ------ | 0 | 0 |
| Rye, 30 cm. high | 18 | 0 | 0 | 0 | 0 | ------ | 0 | 0 |
| | 53 | 0 | 0 | 0 | 0.5 | ------ | 0 | 0 |
| Barley, 45 cm. high | 18 | 0.5 | 0.5 | 0.5 | 0.5 | ------ | 0 | 0 |
| | 53 | 0 | 0 | 0 | 0 | ------ | 0 | 0 |
| Herbicidal effect | 18 | 100 | 100 | 100 | 97 | ------ | 97 | 97 |
| | 53 | 99 | 99 | 98 | 98 | ------ | 98 | 98 |

[1] Height of plants at time of treatment—mean value.

b. Selective Test in summer wheat (Svenno)

1-Allyloxymethyl-2,4,5-tribromo-imidazole was used in an amount of 1.25 kg/ha as active substance.

At the time of application of the active substance the test plants were ca. 20 cm high.

Evaluation of the test plants was made 7, 14 and 21 days after application.

Weeds normally present were those given under a) (2) above as well as Sinapis arv.

Results
(Time of evaluation expressed in days)

| Testplants | 7 | 14 | 21 | 65 |
|---|---|---|---|---|
| wheat "Svenno" | no damage | no damage | no damage | — |
| herbicidal effect | 100% | 100% | 95% | 90% |

We claim:
1. 1-n-Propyloxymethyl-4,5-dibromo-2-chloro-imidazole.
2. 1-Ethyloxymethyl-2,4-5-trichloro-imidazole.
3. 1-n-Propyloxymethyl-2,4,5-trichloro-imidazole.

* * * * *